(12) United States Patent
Payne et al.

(10) Patent No.: US 7,286,575 B2
(45) Date of Patent: Oct. 23, 2007

(54) DIODE PUMPED ALKALI VAPOR FIBER LASER

(75) Inventors: Stephen A. Payne, Castro Valley, CA (US); Raymond J. Beach, Livermore, CA (US); Jay W. Dawson, Livermore, CA (US); William F. Krupke, Pleasanton, CA (US)

(73) Assignee: The Regents of the University of California, Oakland, CA (US)

( * ) Notice: Subject to any disclaimer, the term of this patent is extended or adjusted under 35 U.S.C. 154(b) by 30 days.

(21) Appl. No.: 11/447,391

(22) Filed: Jun. 5, 2006

(65) Prior Publication Data
US 2007/0019689 A1 Jan. 25, 2007

Related U.S. Application Data

(62) Division of application No. 10/679,538, filed on Sep. 30, 2003, now Pat. No. 7,082,148.

(51) Int. Cl.
*H01S 3/30* (2006.01)
(52) U.S. Cl. .............................. 372/6; 372/34; 372/55

(58) Field of Classification Search ................ 372/6, 372/34, 55
See application file for complete search history.

(56) References Cited

U.S. PATENT DOCUMENTS 6,643,311 B2 * 11/2003 Krupke ........................ 372/56
2004/0151454 A1 * 8/2004 Fajardo et al. .............. 385/126

* cited by examiner

*Primary Examiner*—Dung Nguyen
(74) *Attorney, Agent, or Firm*—John P. Wooldridge; John H. Lee

(57) ABSTRACT

A method and apparatus is provided for producing near-diffraction-limited laser light, or amplifying near-diffraction-limited light, in diode pumped alkali vapor photonic-band-gap fiber lasers or amplifiers. Laser light is both substantially generated and propagated in an alkali gas instead of a solid, allowing the nonlinear and damage limitations of conventional solid core fibers to be circumvented. Alkali vapor is introduced into the center hole of a photonic-band-gap fiber, which can then be pumped with light from a pump laser and operated as an oscillator with a seed beam, or can be configured as an amplifier.

20 Claims, 6 Drawing Sheets

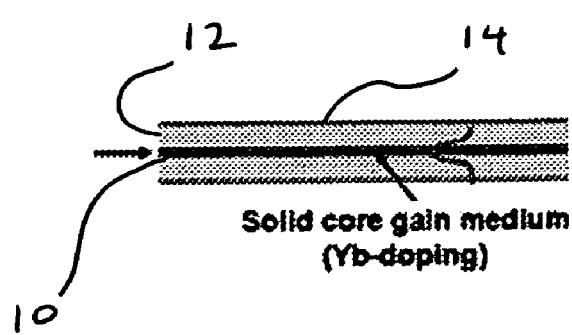
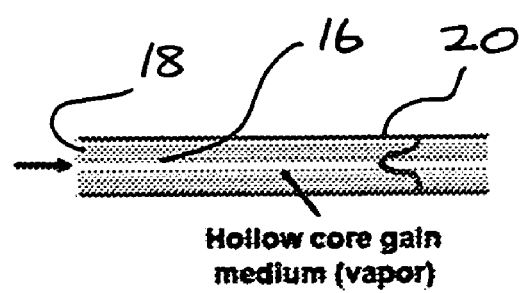
Figure 1A
Figure 1B

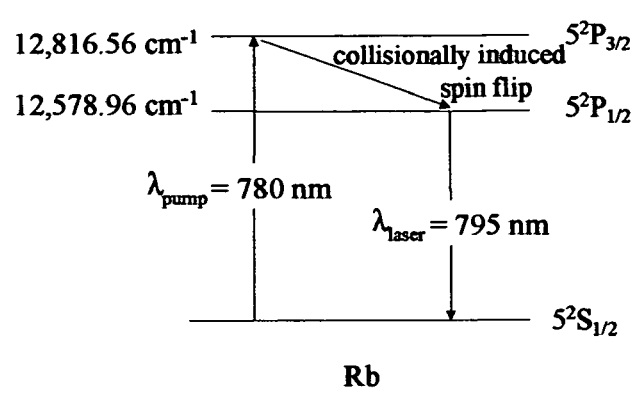
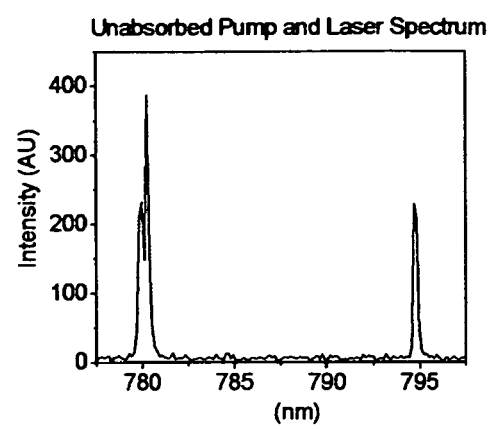
Figure 3A
Figure 3B

DIODE PUMPED ALKALI VAPOR FIBER LASER

This is a Divisional of U.S. patent application Ser. No. 10/679,538, titled: "Diode Pumped Alkali Vapor Fiber Laser" filed Sep. 30, 2003 now U.S. Pat. No. 7,082,148 and incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to fiber lasers, and more specifically, it relates to diode-pumped alkali vapor lasers embodied as fiber lasers.

2. Description of Related Art

For applications requiring high beam quality radiation from efficient, compact and rugged sources, diffraction limited fiber lasers are ideal, and to date have been demonstrated at average power levels near 500 W with near diffraction limited output For conventional single-core, step-index single-mode fibers, this power level represents the scaling limit because of nonlinear and laser damage considerations. Higher average powers would exceed nonlinear process thresholds such as the Raman and stimulated Brillouin scattering limit, or else damage the fiber due to the high intensity level in the fiber's core. One obvious way to increase the average power capability of fibers is to increase the area of their core. Simply expanding the core dimensions of the fiber allows a straightforward power scaling due to enhanced nonlinear and power handling characteristics that scale directly with the core area. However, the enhanced power handling capability that obtains through this route comes at the expense of beam quality, as increasing the core diameter in standard step index fibers permits multiple transverse modes to lase simultaneously. Although this problem of multimode operation can be mitigated to some extent by appropriately designing the fiber's waveguide structure, limitations such as bend radius loss, sensitivity to thermally induced perturbations of the waveguide structure, and refractive index control, all become more stringent as the core diameter grows, limiting the extent to which the core diameter can be grown and still ensure single mode operation from the fiber.

SUMMARY OF THE INVENTION

It is an object to provide a method for producing near-diffraction-limited laser light, or amplifying near-diffraction-limited light, in diode pumped alkali vapor photonic-band-gap fiber lasers or amplifiers.

This and other objects will be apparent based on the disclosure herein.

A method and apparatus is provided for producing near-diffraction-limited laser light, or amplifying near-diffraction-limited light, in diode pumped alkali vapor photonic-band-gap fiber lasers or amplifiers. Laser light is both substantially generated and propagated in an alkali gas instead of a solid, allowing the nonlinear and damage limitations of conventional solid core fibers to be circumvented. Alkali vapor is introduced into the center hole of a photonic-band-gap fiber, which can then be pumped with light from a pump laser and operated as an oscillator with a seed beam, or can be configured as an amplifier.

In one embodiment, the present invention eliminates the optical path within the solid medium of a conventional fiber laser. FIG. 1A shows in a simple way the nature of the guiding of laser light in a solid core gain medium versus in the hollow core laser of FIG. 1B, in which the core is filled with a vapor to serve as the gain medium. FIG. 1A shows a solid core Yb-doped gain medium 10 within a first medium 12 that is surrounded by a second medium 14. FIG. 1B shows a hollow core vapor gain medium 16 within a first photonic-band-gap medium 18, surrounded by a second medium 20.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 1A shows the guiding of laser light in a solid core gain medium contained within a conventional solid dielectric cladding medium.

FIG. 1B shows the guiding of laser light in a hollow core in which the core is is formed within a photonic-band-gap dielectric cladding, and filled with a vapor to serve as the gain medium.

FIG. 3A depicts the energy levels of atomic Rb.

FIG. 3B shows spectral data of the pump radiation at 780 nm and the emitted laser radiation at 795 nm.

DETAILED DESCRIPTION OF THE INVENTION

A new class of laser invented by William F. Krupke is described in U.S. Pat. No. 6,643,311, titled "Diode-Pumped Alkali Laser," filed Oct. 23, 2001 and incorporated herein by reference. This laser uses alkali vapor as the gain medium and is practical for diode pump excitation with the introduction of appropriate buffer and relaxation gases into the atomic vapor cell. William Krupke has coined the name DPAL for this class of laser, standing for Diode-Pumped Alkali Laser. The invention disclosed here provides embodiments of the DPAL laser in a photonic bandgap fiber optic form. In one embodiment, the alkali vapor gain medium is contained in the core of a hollow core photonic bandgap fiber. In another embodiment, the alkali gain medium is contained in either or both the holes of the photonic bandgap fiber and the hollow core. In still another embodiment, the alkali gain medium is contained in the holes of a solid core photonic bandgap fiber, sometimes referred to as a highly nonlinear photonic crystal fiber. The photonic-band-gap fiber optic structure serves to both confine the pump excitation radiation and the developed laser radiation as it propagates along the length of the fiber. The invention has many uses, e.g., as a compact, high average power, high beam quality radiation source for use as unit cells in high power coherent fiber arrays.

Figure 2:
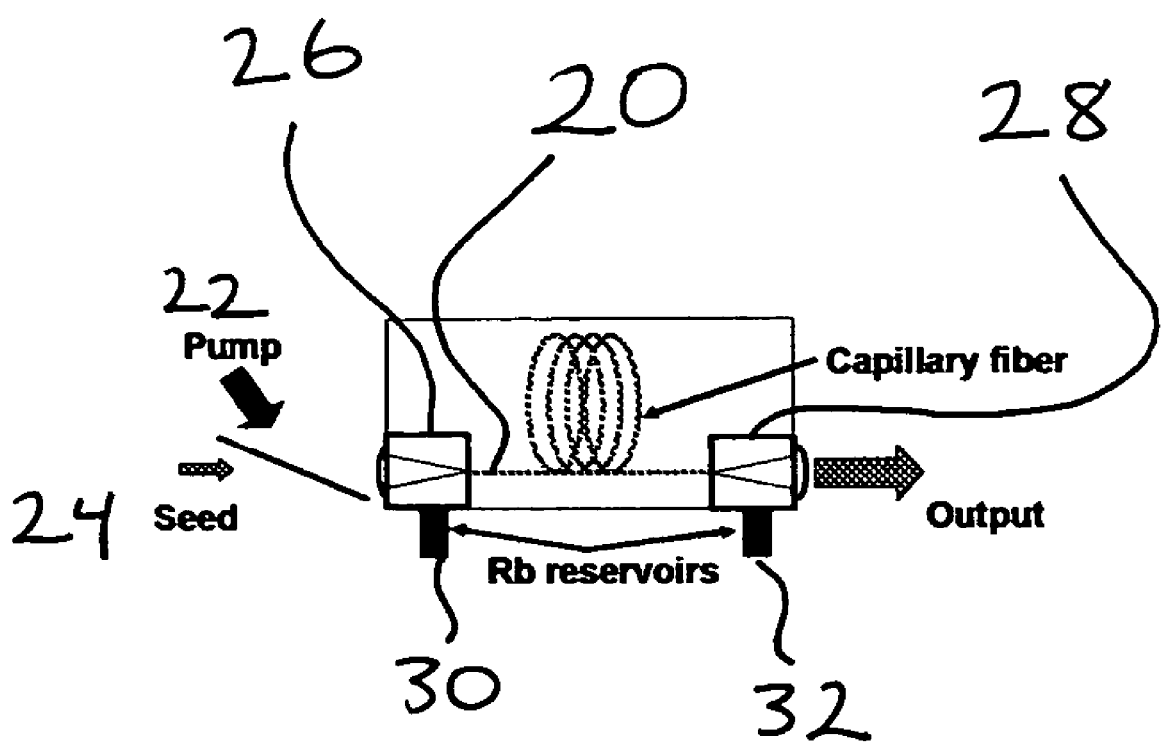
FIG. 2 shows a basic embodiment of the present invention for a case employing Rb vapor as the gain medium.

FIG. 2 shows a basic embodiment of the present invention for a case employing Rb vapor as the gain medium. The figure illustrates a fiber-based architecture where Rb vapor is introduced into the center hole of a photonic-band-gap fiber 20, which can then be pumped with light 22 from a pump laser and operated as an oscillator with seed beam 24. The hollow core DPAL shown in the figure uses a length of photonics-band-gap fiber between two ovens 26 and 28. The purpose of the ovens is to permit the introduction of the vapor into the hollow cavity of the photonic-band-gap fiber while inhibiting condensation onto the optics or inner wall of the photonic-band-gap fiber. Small Rb reservoirs 30 and 32 are held at a controlled temperature to maintain the Rb number density in the vapor. The advantages of the hollow core photonic-band-gap fiber architecture are:

1. Suppression of stimulated Brillouin scattering by virtue of the minimized overlap of the light field with the silica in the fiber (which also permits the amplification of narrow band light, better suited for phase-locking).
2. Mitigation of optical damage via the elimination of the entrance and exit surfaces of the fiber-based gain medium.
3. Reduction of the required temperature needed for adequate Rb vapor density due to the long path lengths that can be supported with a photonic-band-gap fiber.
4. Useful future advantage relating to the phase-locking multiple fibers, since very low heat load and minimal refractive index variation will assure great stability of "piston" from one fiber to the next
5. Very low quantum defect of ~2%, contrasted to typical values near 10-30% for 1 micron solid state lasers.
6. Greatly reduced index gradients and therefore high beam-quality, based on the presence of helium (1-10 atm) rather than solid density material.
7. Efficiency comparable to or greater than the highest (~80%) available from fiber lasers.

As a result of these attributes, the hollow core photonic-band-gap DPAL can scale to >kW-level.

The following brief discussion summarizes the lasing process in atomic Alkali vapors as disclosed by Krupke. Included in this summary are the experimental characterizations that have been done to date by the present inventors using atomic Rb vapor (see reference 1). FIG. 3A depicts the energy levels of atomic Rb used for the first demonstration of a diode-pumpable atomic alkali laser at Lawrence Livermore National Laboratory (LLNL) in December of 2002. The system is pumped on the $D_2$ line at 780 nm and lases on the $D_1$ line at 795 nm. FIG. 3B shows spectral data of the pump radiation at 780 nm and the emitted laser radiation at 795 nm.

The challenge in demonstrating an alkali laser involved addressing two key issues:

1. The Doppler broadened atomic transitions in alkali vapors are typically on the order of GHz, which is much narrower than practical diode pump excitation sources. The present invention resolves this deficiency by collisionally-broadening transitions to many tens of GHz and taking advantage of the fact that the transition becomes homogeneously broadened, so that absorption in the wing of the absorption contributes equally well to the gain as absorption at the central pump wavelength.
2. Because the D line transitions are both dipole-allowed, storage lifetimes are short, being only 28 nsec for the Rb $5^2P_{3/2}$ level used here. For the proposed laser scheme to work, the normally slow $5^2P_{3/2}$ to $5^2P_{1/2}$ spin-flip transition must be sufficiently accelerated so that population can be efficiently transferred into the initial $5^2P_{1/2}$ laser level before it is lost out of the $5^2P_{3/2}$ level through radiative decay. The present invention accomplishes this by adding some ethane to the laser mixture, so that the $5^2P_{3/2} \rightarrow 5^2P_{1/2}$ occurs on a time scale on the order of 1 nsec.

Figure 4:
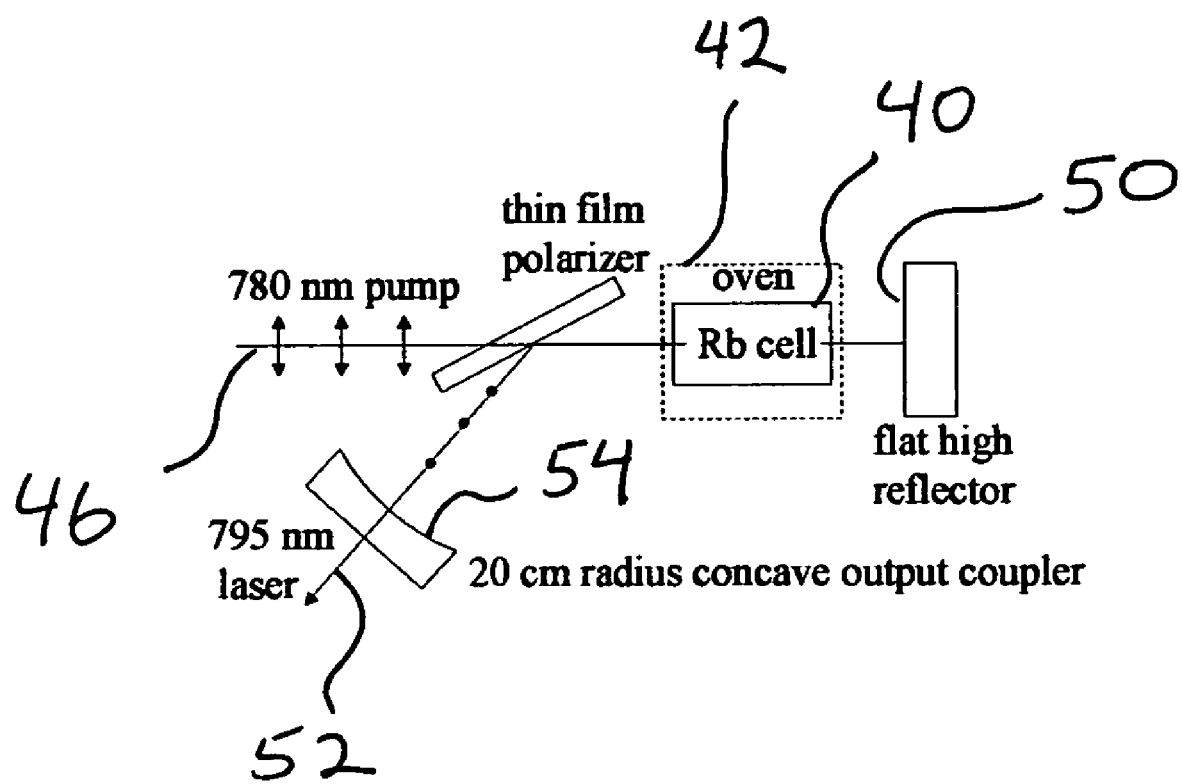
FIG. 4 shows a schematic diagram of an experimental setup used to demonstrate the atomic vapor Rb laser.

FIG. 4 shows a schematic diagram of an experimental setup used to demonstrate the atomic vapor Rb laser. The figure shows a schematic diagram of the atomic Rb vapor laser used in the demonstration. The overall cavity length of the laser was 19 cm for the data presented within.

The sealed Rb cell 40 was commercially procured and had two optical-quality, but uncoated windows at each of its ends. The Rb was buffered with 525 torr of helium and 75 torr of ethane. The cell itself was entirely contained in a closed oven 42 with two AR coated windows to allow access for both the pump and laser beams. The one-way loss for this cavity, excluding output coupling, was high at 20%, but still low enough to allow a lasing demonstration. The oven provided the capability to control the cell temperature to ±1° C. in the vicinity of 120° C. The laser resonator contained a thin film polarizer 44 that allowed the introduction of polarized Ti:Sapphire pump light 46, which was then double passed through the cell after reflecting off the flat high reflector 50. The Rb laser polarization was orthogonal to the pump polarization, and output coupling of beam 52 was through a 20 cm radius concave mirror 54.

Figure 5:
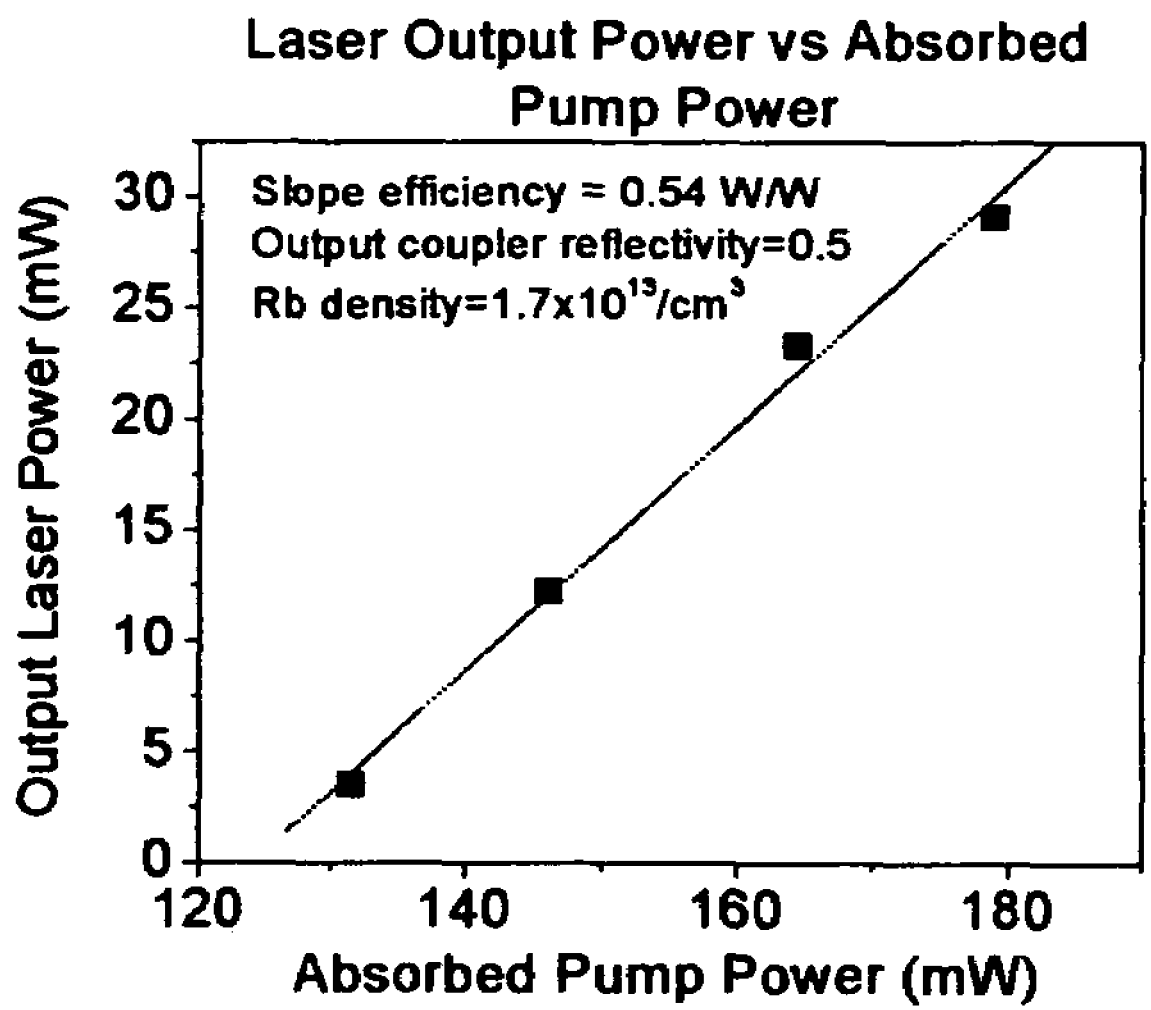
FIG. 5 shows the measured laser output power from the experimental setup of FIG. 4 using an output coupler having 50% reflectivity and a Rb number density of $1.7 \times 10^{13}/cm^3$.

FIG. 5 shows the measured laser output power from the experimental setup of FIG. 4 using an output coupler having 50% reflectivity and a Rb number density of $1.7 \times 10^{13}/cm^3$. Under these conditions the observed slope efficiency of the laser was 54%.

Figure 6A:
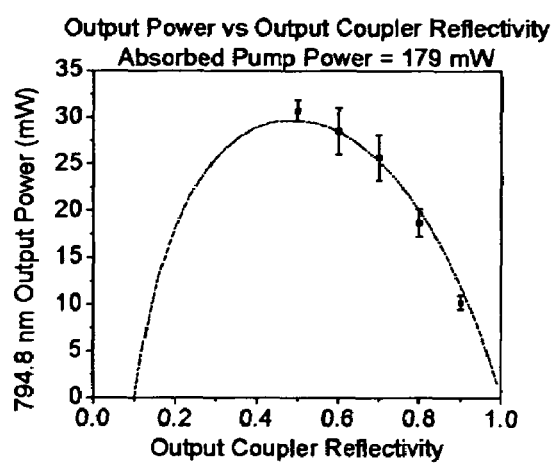
FIG. 6A shows the measured 795 nm output laser power as a function of output coupler reflectivity.
Figure 6B:
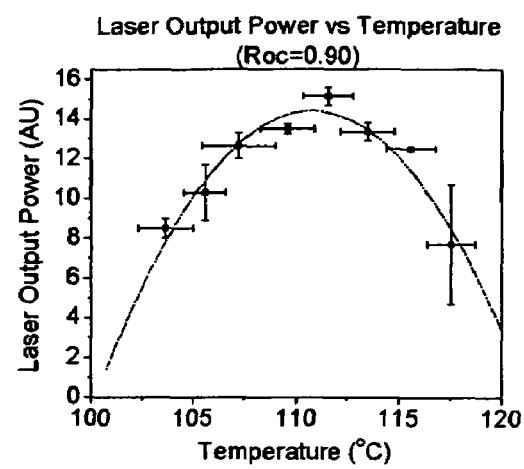
FIG. 6B shows the dependence of output power on Rb cell temperature.

FIG. 6A shows the measured 795 nm output laser power as a function of output coupler reflectivity. FIG. 6B shows the dependence of output power on Rb cell temperature.

In addition to the Rb laser, Cs and K are also usable for an DPAL. When Cs is pumped at 852 nm, lasing occurs at 895 nm. When K is pumped at 767 nm, lasing will occur at 770 nm. Other alkalis beyond Rb and Cs are also usable.

The subject of this disclosure is to adapt the above-described DPALs to hollow core fiber geometries. Although there are several possible fiber geometries compatible with the DPAL laser concept, the most interesting and perhaps the one that is ultimately most useful relies on a photonic-band-gap fiber structure.

Shortly after the development of photonic-band-gap fiber lasers with solid cores, the confinement of light within a hollow core photonic-band-gap structure was demonstrated (see reference 2). A cross sectional photograph of the first hollow core photonic band-gap fiber was reported in the scientific literature in 1999. The core diameter in this structure was 14.8 µm.

Structures generically called "photonic bandgap fibers" or PBFs are sometimes called "holey fibers" as well. Generally speaking, the "holes," which are sized and arrayed appropriately within the solid dielectric material comprising the body of the fiber, are intended to confine and guide optical radiation propagating along the structure, obviating the need to incorporate a metal or dielectric multi-layer stack reflector along the surfaces of the capillary.

The light guiding properties of hollow waveguides using photonic band-gap structures are determined by the patterned air-glass structure surrounding the hollow core. This structure serves to confine certain wavelengths to the hollow core region through a Bragg confinement mechanism that essentially acts as a mirror reflector. Because the photonic-band-gap structure can be varied as a function of radius, independent waveguide structures can be constructed to separately confine the laser radiation to the hollow core and the pump radiation, which has a different wavelength than the laser radiation, to some larger cross sectional area in the fiber. This enables the design of the equivalent of cladding pumped fiber structures, which today use a solid core, with a hollow core to contain the alkali vapor and buffer gas mixture required for the gain medium.

In one type of "hollow-core" PBF, the hollow core is surrounded by a ring of dielectric material dispersed with a pattern of air holes. There is no physical reflector material on either the inner or outer surfaces of the "holey" dielectric annular region. This "holey" inner annular region is contained within an outer solid annular dielectric cladding generally of lower index of refraction than that of the inner annular region. In one embodiment of the present invention, the alkali vapor and buffer gases (referred to herein collectively as the "gain medium") fill only the hollow core. In another embodiment, the gain medium fills both the hollow core and the air holes. In another embodiment, the gain medium fills only the air holes.

Other PBF or "holey" fiber structures are within the scope of the present invention. One type of PBF has a solid dielectric core and a holey surrounding annular region. This "holey" inner annular region is contained within an outer solid annular dielectric cladding generally of lower index of refraction than that of the inner annular region. The alkali vapor and buffer gases are diffused into the holes in this surrounding annular region.

REFERENCES

1. W. Krupke, R. Beach, V. K. Kanz, and S. Payne, "Diode pumpable rubidium laser," OSA, TOPS, Advanced Solid-State Photonics, 83, 124 (2003)
2. R. F. Cregan, B. J. Mangan, J. C. Knight, T. A. Birks, P. St. J. Russell, P. J. Roberts, D. C. Allen, "Single-Mode Photonic Band Gap Guidance in Air," Science, 286, p 1537, 1999.

The above two references are incorporated herein by reference.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A method, comprising:
providing a length of a solid dielectric photonic band-gap fiber material having holes, a core located within said length and a gain medium located within said length, wherein said length is configured in an optical cavity including an output coupler, wherein said gain medium comprises a mixture of at least one buffer gas and an alkali atomic vapor having a $D_1$ transition, wherein said at least one buffer gas has the dual purpose of collisionally broadening a $D_2$ transition of said alkali atomic vapor and collisionally transferring pump excitation from the upper level of said $D_2$ transition to the upper level of said $D_1$ transition at a rate larger than the radiative decay rate of either of these two levels;
holding said gain medium at a temperature $T_1$, wherein said length comprises a hollow fiber optic that is contiguously connected to two ovens, one at each end held at temperature $T_2$ and $T_3$ respectively, wherein $T_1 > T_2, T_3$; and
optically pumping said gain medium to produce laser output.

2. The method of claim 1, wherein said core is hollow, wherein said gain medium is located within said core.

3. The method of claim 2 wherein said gain medium is further located within said holes.

4. The method of claim 1, wherein said gain medium is located within said holes.

5. The method of claim 4, wherein said core is hollow.

6. The method of claim 5, wherein said gain medium is located within said core.

7. The method of claim 4, wherein said core comprises a solid dielectric material.

8. The method of claim 1, further comprising providing a cladding surrounding said length, wherein said cladding has a lower refractive index than said length.

9. The method of claim 1, wherein said alkali vapor is selected from K, Rb, and Cs.

10. The method of claim 1, wherein the step of optically pumping said gain medium is carried out with a laser diode.

11. The method of claim 10, wherein said laser diode is selected from a group consisting of a single stripe laser diode, several single stripe laser diodes, a laser diode bar, several laser diode bars and a fiber-coupled laser diode.

12. The method of claim 10, wherein said laser diode is configured to optically pump said gain medium at 767 nm, 780 nm, or 852 nm.

13. The method of claim 1, wherein said at least one buffer gas is selected from a group consisting of He, Ne, Kr, and Xe.

14. The method of claim 1, wherein said gain medium comprises an additional fine structure ($^2P_{3/2}$-$^2P_{1/2}$) quenching gas.

15. The method of claim 14, wherein said fine structure quenching gas is selected from the group consisting of methane and ethane.

16. The method of claim 1, wherein said holes are sealed at the ends of said length.

17. The method of claim 16, wherein said core is open at each end of said length.

18. The method of claim 1, wherein at least one oven of said two ovens incorporates a transparent optic, enabling optical access to the ends of said fiber optic.

19. The method of claim 18, wherein said photonic-band-gap fiber optic is end pumped.

20. A method, comprising:
providing a length of a solid dielectric photonic band-gap fiber material having holes, a core located within said length and a gain medium located within said length, wherein said gain medium comprises a mixture of at least one buffer gas and an alkali atomic vapor having a $D_1$ transition, wherein said at least one buffer gas has the dual purpose of collisionally broadening a $D_2$ transition of said alkali atomic vapor and collisionally transferring pump excitation from the upper level of said $D_2$ transition to the upper level of said $D_1$ transition at a rate larger than the radiative decay rate of either of these two levels;

holding said gain medium at a temperature $T_1$, wherein said length comprises a hollow fiber optic that is contiguously connected to two ovens, one at each end held at temperature $T_2$ and $T_3$ respectively, wherein $T_1 > T_2, T_3$;

providing an optical signal to be amplified in said gain medium; and optically pumping said gain medium to amplify said optical signal to produce an amplified optical signal.

* * * * *